(12) United States Patent
Ford et al.

(10) Patent No.: US 9,767,457 B1
(45) Date of Patent: Sep. 19, 2017

(54) SYSTEM, METHOD, AND COMPUTER PROGRAM FOR DYNAMICALLY IDENTIFYING A MERCHANT ASSOCIATED WITH AN AUTHORIZATION REQUEST FOR A PAYMENT CARD

(71) Applicant: Marqeta, Inc., Emeryville, CA (US)

(72) Inventors: Anthony Ford, Pittsburg, CA (US); Jason M. Gardner, Oakland, CA (US); Mark Lopez, Mountain House, CA (US); David Matter, San Rafael, CA (US); Jatin P. Salla, Fremont, CA (US)

(73) Assignee: Marqeta, Inc., Oakland, CA (US)

( * ) Notice: Subject to any disclaimer, the term of this patent is extended or adjusted under 35 U.S.C. 154(b) by 0 days.

(21) Appl. No.: 14/447,200

(22) Filed: Jul. 30, 2014

Related U.S. Application Data (63) Continuation-in-part of application No. 13/970,530, filed on Aug. 19, 2013, now Pat. No. 9,613,358.

(51) Int. Cl.
*G06Q 20/40* (2012.01)
(52) U.S. Cl.
CPC ............................... *G06Q 20/4097* (2013.01)
(58) Field of Classification Search
None
See application file for complete search history.

(56) References Cited

U.S. PATENT DOCUMENTS

| | | | |
|---|---|---|---|
| 6,044,360 A | 3/2000 | Picciallo | |
| 6,931,382 B2 | 8/2005 | Laage et al. | |
| 7,664,405 B2 | 2/2010 | Paulson | |
| 7,664,705 B2 | 2/2010 | Walker et al. | |
| 8,191,766 B2 | 6/2012 | Tomchek et al. | |

(Continued)

FOREIGN PATENT DOCUMENTS

| | | |
|---|---|---|
| WO | 0141026 | 6/2001 |
| WO | 02097752 | 12/2002 |

OTHER PUBLICATIONS

European Search Report and Written Opinion in related European Application No. 14180341.1 dated Feb. 19, 2015.

(Continued)

*Primary Examiner* — Robert R Niquette
*Assistant Examiner* — Joseph W King
(74) *Attorney, Agent, or Firm* — Lessani Law Group, PC (57) ABSTRACT

The disclosure is directed to a system, method, and computer program for dynamically identify a merchant associated with an authorization request for a payment card, wherein a merchant identifier in the authorization request is unrecognized. A plurality of unique signatures is created for each of a plurality of registered merchants, wherein the signatures for each registered merchant are based on values of merchant attributes associated with the registered merchant. In response to the system receiving an authorization request for a payment card that includes an unrecognized merchant identifier used to process authorization requests, a plurality of unique signatures is generated for the unrecognized merchant based on a combination of merchant attributes in the authorization request. A payment processing system then determines if the signatures match one of the signatures previously created for the registered merchants. If so, the authorization request is identified as originating from the matching registered merchant.

21 Claims, 6 Drawing Sheets

(56) References Cited

U.S. PATENT DOCUMENTS

| | | |
|---|---|---|
| 8,249,985 B2 | 8/2012 | Giordano et al. |
| 8,290,866 B1 | 10/2012 | Little |
| 8,341,076 B1 | 12/2012 | Wilkes |
| 8,447,670 B1 | 5/2013 | DeLoach |
| 8,626,642 B2 | 1/2014 | Foss et al. |
| 8,635,117 B1 | 1/2014 | Acuna-Rohter |
| 2002/0002485 A1 | 1/2002 | O'Brien et al. |
| 2002/0073045 A1 | 6/2002 | Rubin et al. |
| 2002/0169720 A1 | 11/2002 | Wilson et al. |
| 2004/0186773 A1 | 9/2004 | George et al. |
| 2006/0078099 A1 | 4/2006 | Liebenow et al. |
| 2006/0190412 A1 | 8/2006 | Ostroff |
| 2006/0212407 A1 | 9/2006 | Lyon |
| 2006/0224454 A1 | 10/2006 | Kantor et al. |
| 2007/0112655 A1 | 5/2007 | Jones |
| 2007/0284436 A1 | 12/2007 | Gland |
| 2008/0077506 A1 | 3/2008 | Rampell et al. |
| 2008/0208747 A1 | 8/2008 | Papismedov et al. |
| 2009/0078755 A1 | 3/2009 | Sullivan et al. |
| 2009/0164382 A1 | 6/2009 | Sally |
| 2009/0299841 A1 | 12/2009 | Bishop et al. |
| 2010/0049599 A1 | 2/2010 | Owen et al. |
| 2010/0057580 A1 | 3/2010 | Raghunathan |
| 2010/0058156 A1* | 3/2010 | Hardy-McGee .............. 714/819 |
| 2010/0094699 A1 | 4/2010 | Beal |
| 2010/0301113 A1 | 12/2010 | Bohn et al. |
| 2010/0312629 A1 | 12/2010 | Wolf et al. |
| 2011/0047038 A1 | 2/2011 | Halevi |
| 2012/0130787 A1 | 5/2012 | Stouffer et al. |
| 2012/0215605 A1 | 8/2012 | Gardner et al. |
| 2012/0253852 A1 | 10/2012 | Pourfallah et al. |
| 2012/0330840 A1 | 12/2012 | Stinchcombe |
| 2013/0065564 A1 | 3/2013 | Conner et al. |
| 2013/0262307 A1 | 10/2013 | Fasoli et al. |
| 2013/0262313 A1* | 10/2013 | Martin et al. ................... 705/44 |
| 2013/0282565 A1 | 10/2013 | Barta et al. |
| 2013/0290184 A1 | 10/2013 | Shapiro et al. |
| 2014/0040129 A1 | 2/2014 | Akin |

OTHER PUBLICATIONS

Li, Yingjiu, et al., "A Security-Enhanced One-Time Payment Scheme for Credit Card", Mar. 2004.

* cited by examiner

SYSTEM, METHOD, AND COMPUTER PROGRAM FOR DYNAMICALLY IDENTIFYING A MERCHANT ASSOCIATED WITH AN AUTHORIZATION REQUEST FOR A PAYMENT CARD

RELATED APPLICATIONS

This application is a continuation-in-part of U.S. patent application Ser. No. 13/970,530 titled "System, Method, and Computer Program for Capturing a Unique Identifier for a Merchant in a Purchase Transaction Approval Request," which was filed on Aug. 19, 2013 and which is incorporated by reference as if fully disclosed herein.

BACKGROUND OF THE INVENTION

1. Field of the Invention

This invention relates generally to a payment card system and, more particularly, to a system and method for dynamically identifying a merchant associated with an authorization request for a payment card.

2. Description of the Background Art

Whether a customer is shopping in a brick and mortar merchant location or visiting an online retailer, he is likely to use a credit card, debit card, gift card, or other payment card in order to complete a purchase transaction. When a customer attempts to use a payment card for a purchase at a merchant, the payment card number (e.g., credit card number), purchase amount, and one or more unique identifiers for the merchant are sent, via a merchant processor (e.g., an acquiring bank), to the issuing bank or other entity responsible for approving/declining transactions for the card. These identifiers typically include a merchant ID (MID) and/or a terminal ID (TID), which are assigned to merchants and terminals, respectively by a merchant acquirer. Issuing banks maintain merchant databases that map merchants to their respects MIDs and TIDs so that they identify the merchant for purposes of fraud detection, marketing, customer analysis, etc. As the issuing banks that approve/decline transactions are usually not the entities that assign MIDs and TIDs to merchants, discrepancies between the MIDs/TIDs in the issuing banks' databases and the MIDs/TIDs currently used by corresponding merchants often arise. They typically occur when a merchant switches merchant acquirers, moves a credit card terminal to a different location, opens a new location, etc. In a typical credit card transaction, while a correct MID or TID is ideal, it is not critical. For example, in the case where a customer uses a credit card to make a purchase, the issuing bank primarily decides whether to authorize the transaction based on whether the credit card holder has sufficient credit for the purchase, not based on the identity of the merchant.

U.S. Patent Publication No. US-2012-0215605-A1, filed on Feb. 21, 2012 with Ser. No. 13/400,888 and titled "System and Method for Providing a User with a Single Payment Card on which Prepaid and/or Reward Balances Are Tracked for Multiple Merchants," which is incorporated herein by reference in its entirety, describes a system and method in which multiple merchant purses are associated with a user's account (which may be associated with a physical or electronic card). Each purse corresponds to one merchant, and represents the user's credit balance with the merchant (e.g., prepaid deposits plus rewards). The balance associated with each merchant purse is separately tracked. In essence, each merchant purse represents a subaccount in the user's account via which credits, balances, or rewards with the merchant are tracked.

In this situation where there are multiple merchant purses associated with the same account, it is critical that the purchase transaction be settled with the correct merchant and, therefore, it is necessary for the payment card processor to be able to correctly identify the merchant sending the purchase authorization request. For example, if the payment card processor cannot identify the merchant or maps the MID in the authorization request to the wrong merchant, the transaction would either be denied or the system would debit the wrong merchant purse. If a customer is constantly denied approval of a purchase request due to a discrepancy in the MID and/or other merchant identifying information, the customer has an unsatisfactory experience with the payment card. Therefore, there is a need for enabling a payment card processing system to dynamically identify a merchant associated with an authorization request that includes an unrecognized merchant identifier.

SUMMARY OF THE DISCLOSURE

The present disclosure is directed to a system, method, and computer program for dynamically identifying a merchant associated with an authorization request for a payment card, wherein a merchant identifier in the authorization request is unrecognized. In one embodiment, a plurality of unique signatures is created and stored for each of a plurality of registered merchants, wherein the signatures for each registered merchant are based on values of merchant attributes associated with the registered merchant. In response to the system receiving an authorization request for a payment card that includes an unrecognized merchant identifier used to process authorization requests, a plurality of unique signatures is generated for the unrecognized merchant based on a combination of merchant attributes in the authorization request. The signatures generated for the unrecognized merchant are based on the same combinations of merchant attributes as the signatures generated for the registered merchants. The signatures are generated such that the same combination of values in the same order produce the same signatures. A payment processing system then determines if one or more of the signatures match one of the signatures created for the registered merchants. If so, the authorization request is identified as originating from the matching registered merchant and processed accordingly.

In certain embodiments, processing the authorization request includes applying at least one rule and if the rule is not satisfied, the authorization request is rejected. For example, the rule may be that the matching signature(s) must have been previously generated for the matching registered merchant a threshold number of times (i.e., confirmed a threshold number of times). Another example of a rule is that a minimum number of signatures generated for the unrecognized merchant must match. In certain embodiments, a rule may be based on the account holder's profile, such as whether the account holder has satisfied a threshold spending amount. In certain embodiments, if the rule(s) are satisfied and the authorization request is for a purchase, the system approves the request if the applicable account holder has sufficient credit or deposits for the purchase.

DETAILED DESCRIPTION OF THE PREFERRED EMBODIMENTS

Figure 1:
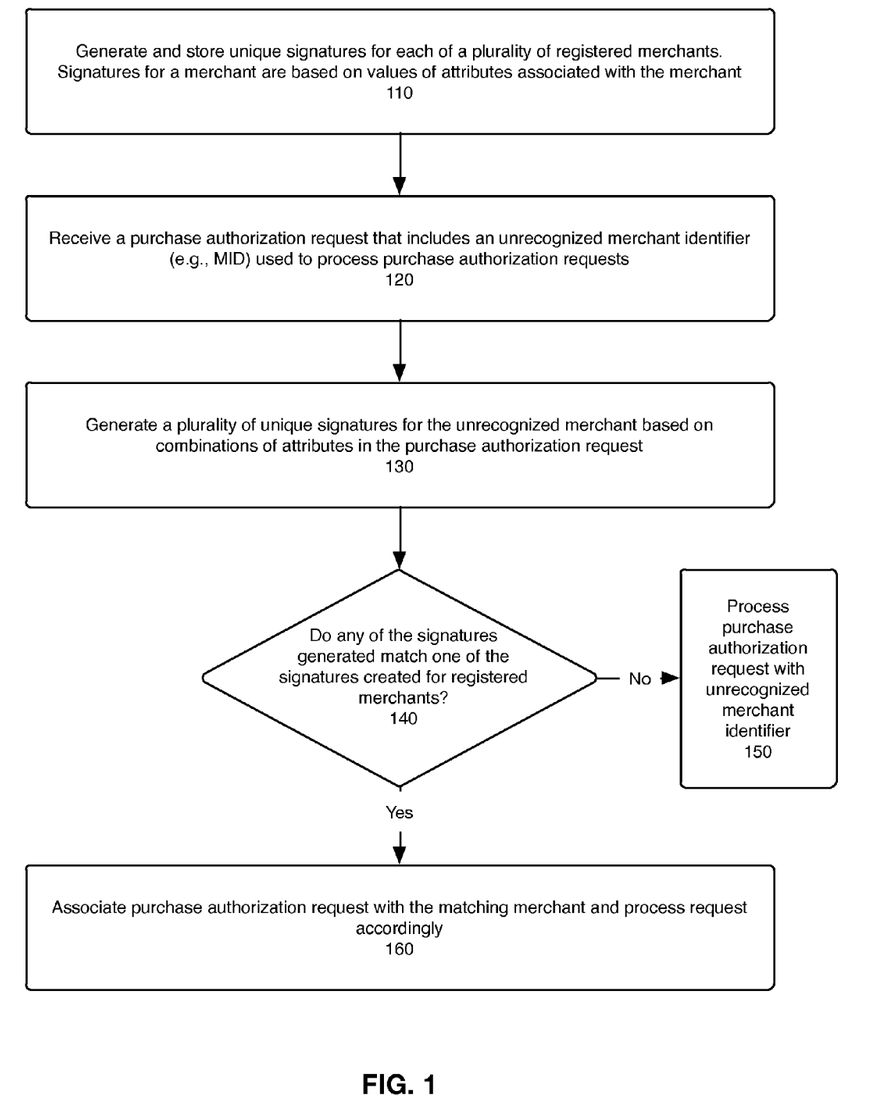
FIG. 1 is a flowchart that illustrates a method, according to one embodiment of the disclosure, for dynamically identifying merchants associated with an authorization request for a payment card.

FIG. 1 illustrates a method, performed by a payment card processing system, for dynamically identifying merchants associated with an authorization request for a payment card. As used herein, a payment card processing system is any system within a payment card network that processes authorization requests (e.g., requests for approval of purchase transactions) for a payment card. The payment card system may be associated with the underlying bank issuing the credit card, the company marketing the card, or the company managing the card. A payment card may be any card or device used to make a payment or track loyalty/reward points, such as a prepayment card, credit card, debit card, gift card, or loyalty/reward program card. A payment card may be a physical card (e.g., a credit card) or in electronic form (e.g., an electronic payment card).

Referring to FIG. 1, the payment card processing system (the "system") generates and stores unique signatures for each of a plurality of merchants registered with the system (step 110). A "registered" merchant may be any merchant for which the system stores information. The signatures are based on values of merchant attributes associated with the merchant, such as merchant data elements in an International Organization for Standardization (ISO) 8583 Authorization Request. For example, the signatures may be based on various combinations of attributes, such as the merchant name, the merchant location, the terminal ID, etc. An example of a process for generating signatures is described below with respect to FIG. 2.

In one embodiment, step 110 is performed on an on-going basis as new merchants are added or new merchant data is received. Likewise, the system receives and processes authorization requests for payment cards on an on-going basis. An authorization request may be a request to authorize a purchase, or may be another transaction-related request pertaining to a payment card. The system uses a merchant identifier, such as Merchant ID (MID), in the authorization request to determine the source of the request. There are usually multiple data items related to a merchant in an authorization request. The term "merchant identifier" as used herein means the merchant identifier primarily used by the system used to identify merchants and process authorization requests.

When the system receives an authorization request that includes an unrecognized merchant identifier (step 120), the system generates a plurality of unique signatures for the unrecognized merchant based on a combination of merchant attribute values in the authorization request (step 130). The system then determines if one or more of the signatures generated in step 130 matches one or more of the signatures previously created for registered merchants (step 140). If so, the system associates the authorization request with the matching merchant and processes the request accordingly (step 160). If not, the system processes the request with the unrecognized merchant identifier (step 150), which, as discussed below, may involve rejecting the request or applying other rules to see if the request can still be approved.

Although methods disclosed herein may be used in any type of payment card system, they are particularly useful in a prepayment card system or reward card system that enables a payment cardholder to associate multiple merchant purses (i.e., subaccounts) with the payment cardholder's account. An example of such a system is described in U.S. Patent Publication No. US-2012-0215605-A1, which as discussed above, is incorporated by reference herein. In such systems, processing the request for a recognized merchant may include traversing the applicable cardholder's account to determine whether there are sufficient funds or credit in the account for use with the recognized merchant. If so, the system may approve the authorization request (if it is for a purchase) and debit the applicable merchant purse in the user's account accordingly.

The system may reject all requests from unrecognized merchants, or the system may apply rules or follow a decision tree to see if the request can still be approved. For example, the system may approve all requests from unrecognized merchants if the purchase amount is below a price threshold, or if the payment card belongs to a high-value customer. In one embodiment, despite no signature match, the system will approve a purchase authorization request with an unrecognized merchant identifier if the merchant name in the purchase authorization request matches the name of a registered merchant and the purchase amount is below a threshold amount, provided the applicable account holder has sufficient funds deposited with the merchant (in the case of a prepaid account) or sufficient credit associated with the account.

In some embodiments, the system may apply one or more rules before step 130 to determine whether to approve the transaction without performing signature matching. For example, for certain high-value customers the system may decide to approve the request regardless of whether the merchant can be identified, provided the purchase amount is below a threshold.

In one embodiment, an authorization request conforms with ISO 8583 and includes a field for a merchant ID or MID. In some embodiments, the MID is the primary merchant identifier used to process authorization requests, but the methods described herein are NOT limited to using the MID as the merchant identifier (or to an ISO 8583 Authorization Request). Any data that uniquely identifies a merchant, such as a geo-location or a point-of-sale terminal ID, may be used as the merchant identifier.

Figure 2:
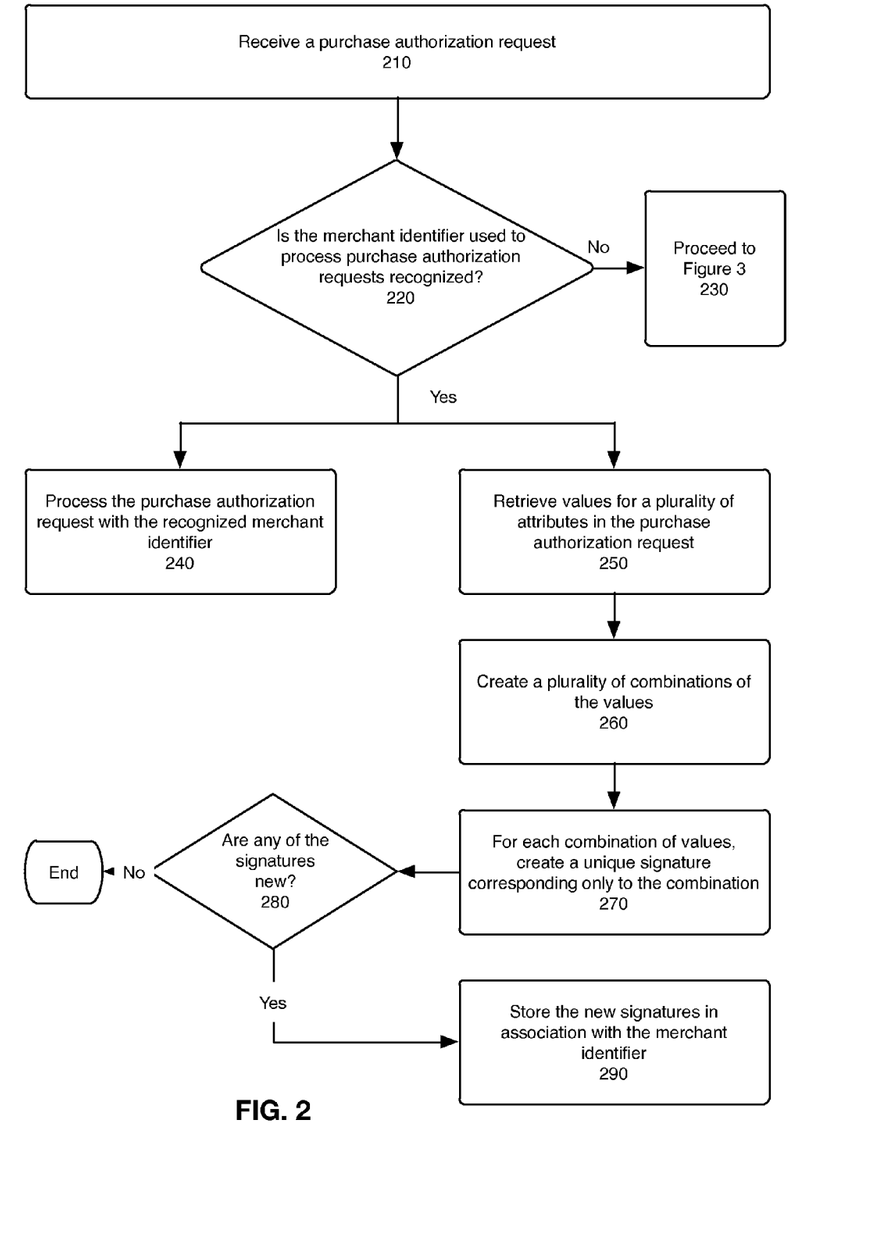
FIG. 2 is a flowchart that illustrates an example, according to one embodiment, of a method for creating signatures for registered merchants.

FIG. 2 illustrates an example, according to one embodiment, of a method for creating signature for registered merchants. Registered merchants may be merchants that have registered with the system, or may be merchants for which the system stores information (regardless of whether the merchant itself registered). In response to receiving an authorization request (step 210), the system determines if the merchant identifier is recognized (step 220). For example, if MIDs are used to process authorization requests, the system determines if the MID is recognized (i.e., matches a MID stored in association with a registered merchant). If merchant geolocation is used to process authorization requests, then the system determines if the geolocation in the authorization request matches a geolocation stored for a registered merchant.

In one embodiment, the system determines whether a merchant identifier is recognized by comparing the applicable merchant identifier in the authorization request with previously-stored merchant identifiers for merchants. In one embodiment, previously-stored merchant identifiers are captured during a registration process, such as, for example, the registration process described in parent U.S. patent application Ser. No. 13/970,530. However, such data may be obtained in other ways, and the methods described herein do not necessarily require that the merchant specifically register with the system. For example, merchant information, such as merchant name, address, MIDs and TIDs, may obtained from merchant acquirers (see FIG. 4), which are the entities that assign MIDs to merchants and store merchant data.

Figure 3A:
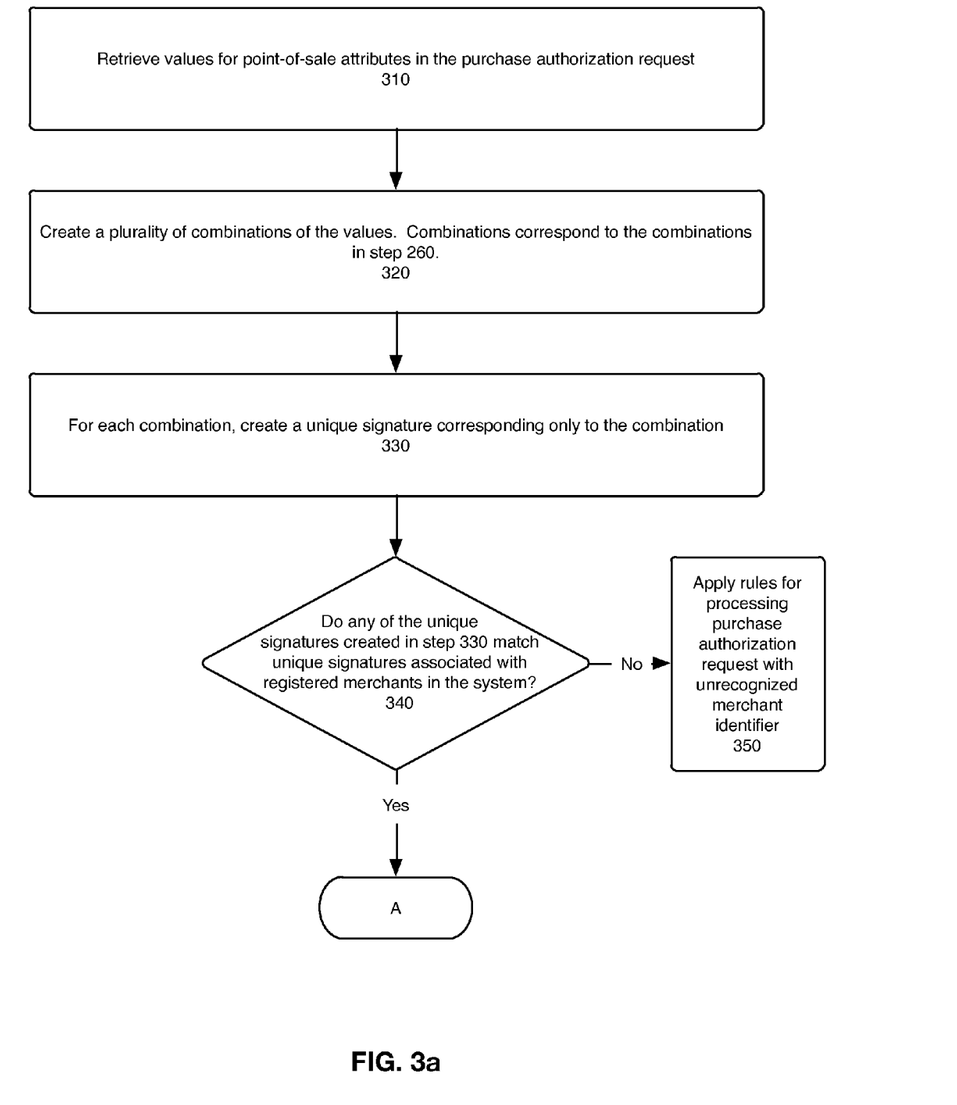
FIGS. 3a-b are a flowchart that illustrates an example, according to one embodiment, of method for processing an authorization request that includes an unknown merchant identifier.

If the merchant identifier is not recognized, the system proceeds to the steps illustrated in FIG. 3 (step 230). If the merchant identifier is recognized, the system processes the authorization request normally with the recognized merchant identifier (step 240). In addition, the system retrieves values for a plurality of merchant attributes in the authorization request (step 250). The merchant attributes may be point-of-sale attributes, such as a Terminal ID (TID) and Location, or may be general merchant attributes, such as Merchant Name. The system creates a plurality of combinations of the values (step 260) and, for each of the combination of values, generates a unique signature corresponding to only to the combination (step 270). Signatures are generated such that the same combination of values in the same order will always produce the same signature.

A signature may be any combination of number, letters, and symbols. In one embodiment, a signature is a concatenation of strings. In another embodiment, a signature is an output of a hash algorithm in which string values (i.e., merchant attribute values) are the input and a unique sequence of characters (e.g., number, letters and/or symbols) is the output. The output corresponds only to the value and order of the inputs. Examples of hash algorithms include MD5, SHA1, and SHA256, but the invention is not limited to a particular hash algorithm. An advantage of using a hash algorithm that outputs a numerical signature is that performing a signature match is faster for numerical signatures, and the decision to approve or deny an authorization request typically must be done in less than seven seconds.

Referring again to FIG. 2, the system determines if any of the generated signatures are new for the merchant (step 280). If not, the signatures are already stored in association with the merchant. If they are new, the system stores the signatures in association with the merchant identifier used for the merchant (e.g., the merchant's MID) (step 290). For example, if geolocation is used to process authorization requests, then the signatures are stored in association with the merchant's geolocation.

In most cases authorization requests need to be processed as quickly as possible (e.g., in less than 7 seconds), and, consequently steps 250-290 are performed after step 240. However, such steps can be performed in parallel with or before step 240.

In the embodiment illustrated in FIG. 2, steps 250-290 are performed for every authorization request with a recognized merchant identifier. This ensures that the signatures reflect the most recent merchant data. However, signatures for registered merchants may be generated less frequently. For example, steps 250-290 could be performed periodically. Alternately, the signatures may only be generated once at or around the time the merchant registers, based on the merchant data obtained during the registration process, or at the time the system receives merchant data from a merchant acquirer (if applicable).

Figure 3B:
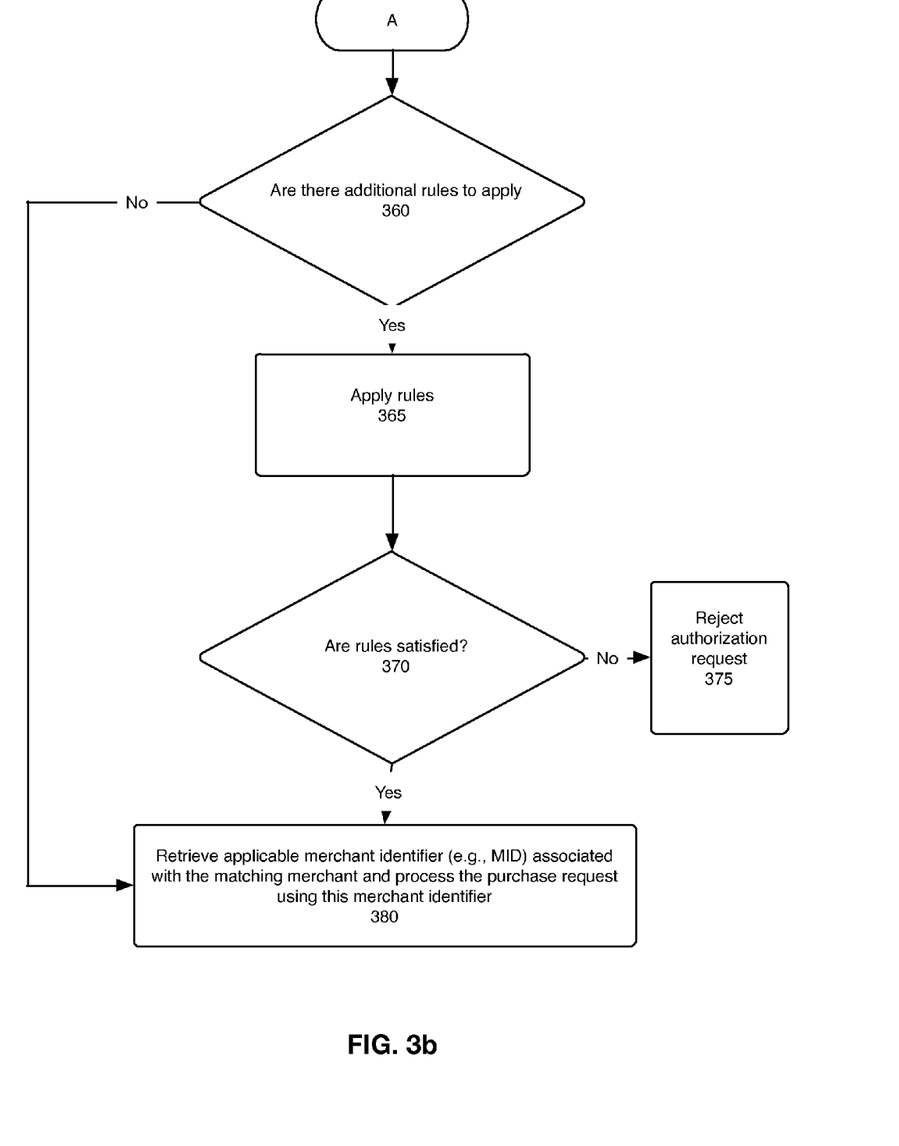

FIGS. 3a-b illustrate an example, according to one embodiment, of method for processing an authorization request that includes an unrecognized merchant identifier. The system retrieves merchant attribute values from the authorization request (step 310), and creates a plurality of combinations of the values. The combinations are the same combinations of attributes, in the same order, as those created in step 260. For example, if the combinations used to generate signatures for registered merchants in step 270 are (i) Merchant Name, TID, and Location, (ii) Merchant Name, TID, and Partial Location, and (iii) Merchant Name and Location, then the same combinations, in the same order, would be used in step 320. In one embodiment, the merchant attributes used in the combinations selected in steps 260 and 320 to create signatures do not include the merchant identifier that is used to process transactions. This is because the signatures are used when the merchant identifier is unrecognized.

In some embodiments, the source of merchant attributes used to generate signatures in steps 260 and 370 are not limited to attributes within an authorization requests. The attributes may be obtained from other sources, such as an EMV card or an external website/web service. For example, geo-location data can be obtained from an embedded chip on a payment card or device. If the cardholder is making a purchase at a brick-and-mortar store, this would provide the merchant's location. Also, the system can check into a social website, such as Foursquare, to see if the account holder is checked in at a particular merchant. If so, merchant name, GPS coordinates, and other merchant attributes could be obtained from such website/web services.

For each of the created combination of values, the system generates a unique signature corresponding only to the combination of values (step 330). The same hash algorithm or process used to generate signatures in step 270 are used in step 330. In other words, the same combination of values in the same order, should produce the same signature in steps 260 and 330. The system determines if the one or more unique signatures generated in step 330 match one or more unique signatures associated with registered merchants in the system. If there is no match, the system applies rules for processing request without a recognized merchant identifier (i.e., without the identifier typically used to process transactions). The system may simply reject the request or apply other rules for processing the request, as discussed with respect to step 150.

If there is a match, the system determines if there are additional rules to apply (step 360). If not, the system retrieves the applicable merchant identifier (i.e., the identifier used to process authorization requests) associated with the matching merchant and processes the purchase request using the merchant identifier (step 380). If there are additional rules to apply, the system applies the rules and determines whether the rules for proceeding with the authorization are satisfied (steps 360, 370). If so, the system proceeds to step 380. If not, the system rejects the request (step 375).

In one embodiment, the rules in step 365 involve determining whether the transaction is associated with a threshold confidence level. In other words, in such embodiment, a confidence level may be determined by a number of factors, such as cardholder profile/attributes (e.g., amount spent each year, number of years cardholder has had account, etc.), the number of signatures that match, and the number of times the signatures have been confirmed. For example, a rule may specify that at least two signatures match and that the signature have been confirmed (e.g., previously generated for the merchant in other transactions) at least twice to reach a threshold confidence level. Alternately, another rule may specify that a threshold confidence level is satisfied if the account holder spends more than a specified minimum amount on an annual basis (e.g., US$2500) and the purchase amount in the authorization request is below a specified maximum level (e.g., <$500).

In one embodiment, if there is a match in step 340 and MID is the merchant identifier used to process transactions, the system sends a message (via email, text, a merchant interface/portal, etc.) to the matching merchant inquiring as to whether the merchant has changed its merchant acquirer (e.g., the entity that assigns MIDs to merchants) or has a new location. The system may provide an interface via which the merchant can respond to the request (e.g., the Merchant Portal 530 in FIG. 5). If the merchant identifier is a MID and if the system determines, based on the merchants response to the message, that the merchant has changed the merchant acquirer, the system replaces the MID previously associated with the merchant with the MID that accompanied the authorization request. If the system determines that the merchant has added a new location, the system adds the MID accompanying the authorization request to the MIDs associated with the merchant. If the merchant has neither changed merchant acquirers nor added a new location, the system may suspend the MID associated with the merchant until the MID discrepancy is resolved.

The methods described with respect to FIGS. 1-3 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

Figure 4:
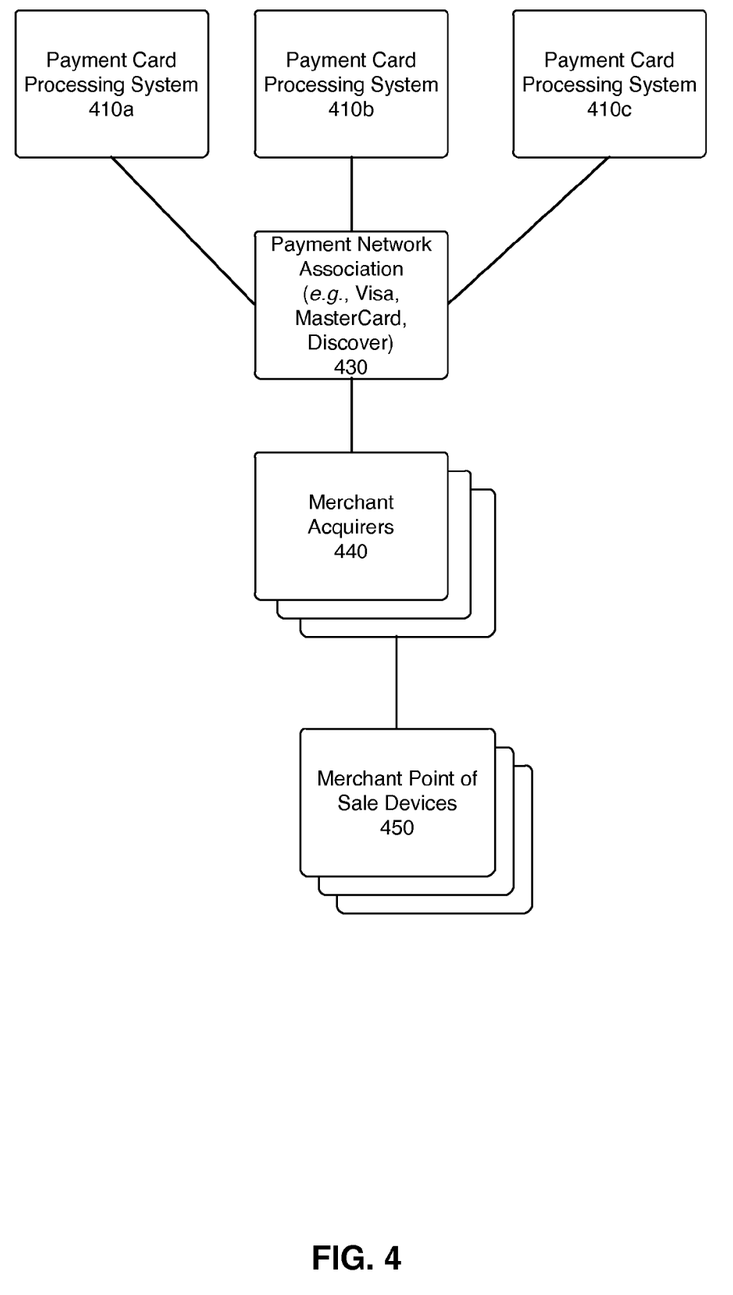
FIG. 4 is a diagram of a payment card network according to one embodiment of the invention.

FIG. 4 illustrates an example of a payment system network 400 according to one embodiment. As a person skilled in the art would understand, the system 400 may be constructed in other ways within the scope of the present invention. The methods of FIGS. 1-3 may be implemented in other systems and are not limited to system 400.

In the preferred embodiment, the payment system network 400 includes various payment card processing systems 410a, 410b, 410c for processing different payment cards. These systems are usually associated with the issuing bank for the payment card (e.g., CapitalOne, Citicard, Bank of America, etc.), but may be associated with any company that processes payment card transactions. The payment card processing systems 410a, 410b, and 410c are connected to merchant point of sale devices 450 (e.g., credit or debit card readers) via a payment network association (e.g., Visa, MasterCard, Discover, etc.) 430, and one or more merchant acquirers 440. A merchant acquirer directs authorization requests from merchant point-of-sale devices 450 to the applicable payment network association 430 and directs responses to authorization requests back to the applicable merchant point-of-sale device 450. In one embodiment, when a customer's card is swiped at a merchant point of sale device 450, a purchase authorization request is sent to the applicable payment card processing system 410 via a merchant acquirer 440 and the applicable payment network association 430. If there is credit or funds available, the payment card processing system 410 authorizes the transaction by sending an authorization code to the merchant point of sale device 450 via the merchant acquirer and payment network association. At the end of the day, purchase transactions from a merchant are batched together and send to payment card processing systems 410a-c for settlement.

Figure 5:
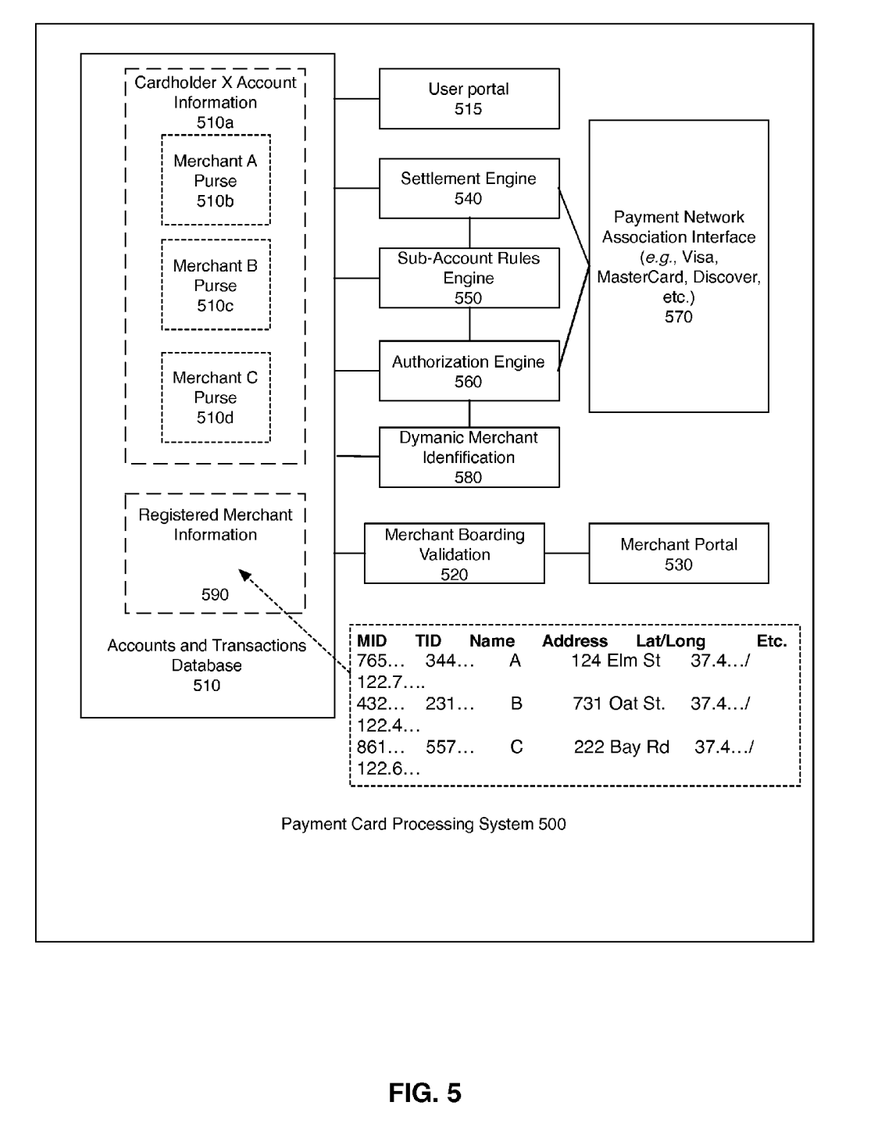
FIG. 5 is a diagram of a payment card processing system according to one embodiment of the invention.

FIG. 5 illustrates an exemplary payment card processing system 500 in which multiple merchant purses may be associated with a user's account, as discussed in U.S. Patent Publication No. US-2012-0215605-A1, which is incorporated herein by reference. System 500 includes a user portal 515 (e.g., a web-based application or a dedicated mobile or desktop application) that allows basic payment card functionality and management of merchant relationships. Via the user portal 515, a user can check balances of each individual merchant purse on a payment card associated with the user's account, view recent transactions, exchange prepayment credits with other users, view and accept new deal offers from merchants, and/or share information via social networks. The user portal 515 is also the avenue for a user to activate a card before initial use at a brick and mortar merchant or an online merchant. In response to the user accepting a deal from a merchant, a purse for the merchant is added the user's account.

System 500 includes a Merchant Boarding Validation Module 520 that validates merchant MIDs, TIDs, and other information in accordance with the method described with respect to parent U.S. patent application Ser. No. 13/970, 530.

System 500 includes a Merchant Portal 530 (e.g., a web-based application or a dedicated application) via which a merchant can register, as well as create and manage deals and campaigns. The Merchant Portal 530 provides the interface via which the merchant registers with System 500, as described with parent U.S. patent application Ser. No. 13/970,530. In one embodiment, the Merchant Portal 530 also includes various reporting tools to enable a merchant to see information related to various campaigns and deals. As discussed above, a merchant does not necessarily have to register with the system 500 to be considered a "registered merchant." Rather, in at least some embodiments, a registered merchant can be any merchant for which the system 500 simply stores merchant-related data.

System 500 includes an Accounts and Transactions Database 510, which may be stored on disk or in memory. The database stores information on each account holder 510a. Each account may have one or more purses associated with the account. For example, for Cardholder X's account, there are three purses associated with the account: Merchant A Purse 510b, Merchant B Purse 510c, and Merchant C Purse 510d. A person skilled in the art would understand that there may be more or less purses associated with an account within the scope of the present invention. Each merchant purse may have one or more sub-accounts that are used to manage the accounting when a user attempts to purchase a product/service using the user account. For example, a purse funds sub-account may specify available purse funds, as well as various bank/institution transaction fees that accrue when the prepayment card is used to make a purchase. If rewards are offered in exchange for prepaid money, another sub-account may track prepaid and rewards dollars including committed (but unfunded) merchant reward dollar amounts and funded merchant reward dollar amounts. The Accounts and Transactions Database 510 also includes Registered Merchant Information 590 in which data-related to merchants is stored, including signatures created for merchants. As depicted in the accompanying table, in addition to the signatures, the Registered Merchant Information 590 also may include the MID, TID, Name, Address, Latitude/Longitude, and other attributes of each registered merchant.

System 500 includes an Authorization Engine 560 that processes purchase authorization requests. When a merchant in a purchase authorization request is recognized or identified, the Authorization Engine 560 traverses Database 510 to determine whether or not a user has sufficient funds, or an overflow account, in an applicable merchant purse to complete a purchase from the merchant using the account. Authorization Engine 560 interfaces with the Payment Network Association by means of a Payment Network Association Interface 575.

System 500 also includes a Sub-Account Rules Engine 450 that applies sub-accounting rules to the merchant purses within Database 510. In one embodiment, the sub-accounting rules define how rewards (if applicable) are calculated and which funds in the subaccounts (e.g., prepaid funds vs. reward funds) are used to settle a transaction. System 500 also includes a Settlement Engine 440 that manages the settlement and funding of transactions and that also interfaces with Payment Network Association.

System 500 includes a Dynamic Merchant Identification software module 580 that communicates with the authorization engine and that dynamically attempts to identify a merchant when the authorization engine receive an authorization request with an unrecognized, but required merchant identifier (per FIG. 1 or 3).

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a payment card system that processes payment card transactions, for dynamically identifying merchants associated with one or more purchase authorization requests, wherein each merchant is associated with a select merchant identifier used to identify said merchant for the purpose of processing the one or more purchase authorization requests, the method comprising:

creating and storing a plurality of unique signatures for each of a plurality of registered merchants, wherein each of the plurality of unique signatures for the plurality of registered merchants is based on a combination of values of merchant attributes associated with each registered merchant, and wherein the plurality of unique signatures for the plurality of registered merchants are created in response to receiving one or more purchase authorization requests in which the select merchant identifier is recognized and matched to a registered merchant, and wherein the values of the merchant attributes for the plurality of unique signatures for the plurality of registered merchants are obtained from said one or more purchase authorization requests having recognized select merchant identifiers;

receiving a purchase authorization request for a payment card that includes an unrecognized merchant identifier to be used to process purchase authorization requests, wherein the unrecognized merchant identifier corresponds to an unrecognized merchant;

generating a plurality of unique signatures for the unrecognized merchant based on a combination of values of merchant attributes in the purchase authorization request having the unrecognized merchant identifier, wherein the plurality of unique signatures for the unrecognized merchant are based on the same combination of merchant attributes as the plurality of unique signatures for the plurality of registered merchants;

determining that one or more of the generated plurality of unique signatures for the unrecognized merchant match one or more of the plurality of unique signatures for the plurality of registered merchants; and in response to one or more of the generated plurality of unique signatures for the unrecognized merchant matching one or more of the plurality of unique signatures for the plurality of registered merchants, associating the purchase authorization request having the unrecognized merchant identifier with the select merchant identifier of a registered merchant for which the one or more unique signatures for the unrecognized merchant and for the registered merchant match, and processing the purchase authorization request as originating from the matched registered merchant.

2. The method of claim 1, wherein processing the purchase authorization request includes applying at least one rule and, if the rule is not satisfied, the purchase authorization request is rejected.

3. The method of claim 2, wherein the rule is that the plurality of unique signatures must have been previously confirmed for the matched registered merchant a threshold number of times.

4. The method of claim 2, wherein the rule is that a minimum number of unique signatures for the unrecognized merchant must match one or more of the plurality of unique signatures for the plurality of registered merchants.

5. The method of claim 2, wherein the rule is that an account holder associated with the payment card must satisfy a threshold spending amount.

6. The method of claim 1, wherein the payment card is for an account with one or more merchant purses, wherein processing the purchase authorization request comprises:

determining that an account holder associated with the purchase authorization request has sufficient funds for the purchase in a merchant purse associated with the matched registered merchant; and approving the purchase authorization request in response to the account holder having sufficient funds in the merchant purse.

7. The method of claim 1, wherein the merchant identifier is a MID.

8. The method of claim 1, wherein the merchant attributes used in the combinations include two or more of the following: merchant name, merchant location, merchant TID, merchant category code, and swipe/online flag.

9. The method of claim 1, further comprising:

in response to none of the generated plurality of unique signatures for the unrecognized merchant matching any of the plurality of unique signature for the plurality of registered merchants, determining that a value for a merchant name attribute in the purchase authorization request matches a name associated with a registered merchant; and in response to the value of the merchant name attribute matching a name associated with a registered merchant and in response to a purchase amount in the purchase authorization request being below a threshold value, approving the purchase authorization request.

10. A payment card system for dynamically identifying merchants associated with one or more purchase authorization requests, wherein each merchant is associated with a select merchant identifier used to identify said merchant for the purpose of processing the one or more purchase authorization requests, the payment card system comprising:

one or more processors;

one or more memory units coupled to the one or more processors, wherein the one or more memory units store instructions that, when executed by the one or more processors, cause the payment card system to perform the operations of:

creating and storing a plurality of unique signatures for each of a plurality of registered merchants, wherein each of the plurality of unique signatures for the plurality of registered merchants is based on a combination of values of merchant attributes associated with each registered merchant, and wherein the plurality of unique signatures for the plurality of registered merchants are created in response to receiving one or more purchase authorization requests in which the select merchant identifier is recognized and matched to a registered merchant, and wherein the values of the merchant attributes for the plurality of unique signatures for the plurality of registered merchants are obtained from said one or more purchase authorization requests having recognized select merchant identifiers;

receiving a purchase authorization request for a payment card that includes an unrecognized merchant identifier to be used to process purchase authorization requests, wherein the unrecognized merchant identifier corresponds to an unrecognized merchant;

generating a plurality of unique signatures for the unrecognized merchant based on a combination of values of merchant attributes in the purchase authorization request having the unrecognized merchant identifier, wherein the plurality of unique signatures for the unrecognized merchant are based on the same combination of merchant attributes as the plurality of unique signatures for the plurality of registered merchants;

determining that one or more of the generated plurality of unique signatures for the unrecognized merchant match one or more of the plurality of unique signatures for the plurality of registered merchants; and in response to one or more of the generated plurality of unique signatures for the unrecognized merchant matching one or more of the plurality of unique signatures for the plurality of registered merchants, associating the purchase authorization request having the unrecognized merchant identifier with the select merchant identifier of a registered merchant for which the one or more unique signatures for the unrecognized merchant and for the registered merchant match, and processing the purchase authorization request as originating from the matched registered merchant.

11. The payment card system of claim 10, wherein processing the purchase authorization request includes applying at least one rule and, if the rule is not satisfied, the purchase authorization request is rejected.

12. The payment card system of claim 11, wherein the rule is that the plurality of unique signatures must have been previously confirmed for the matched registered merchant a threshold number of times.

13. The payment card system of claim 11, wherein the rule is that a minimum number of unique signatures for the unrecognized merchant must match one or more of the plurality of unique signatures for the plurality of registered merchants.

14. The payment card system of claim 11, wherein the rule is that an account holder associated with the payment card must satisfy a threshold spending amount.

15. The payment card system of claim 10, wherein the payment card is for an account with one or more merchant purses, wherein processing the purchase authorization request comprises:

determining that an account holder associated with the purchase authorization request has sufficient funds for the purchase in a merchant purse associated with the matched registered merchant; and approving the purchase authorization request in response to the account holder having sufficient funds in the merchant purse.

16. A non-transitory, computer-readable medium comprising a computer program, that, when executed by a payment card system, enables the payment card system to perform the following method for dynamically identifying merchants associated with one or more purchase authorization requests, wherein each merchant is associated with a select merchant identifier used to identify said merchant for the purpose of processing the one or more purchase authorization requests, the method comprising:

creating and storing a plurality of unique signatures for each of a plurality of registered merchants, wherein each of the plurality of unique signatures for the plurality of registered merchants is based on a combination of values of merchant attributes associated with each registered merchant, and wherein the plurality of unique signatures for the plurality of registered merchants are created in response to receiving one or more purchase authorization requests in which the select merchant identifier is recognized and matched to a registered merchant, and wherein the values of the merchant attributes for the plurality of unique signatures for the plurality of registered merchants are obtained from said one or more purchase authorization requests having recognized select merchant identifiers;

receiving a purchase authorization request for a payment card that includes an unrecognized merchant identifier to be used to process purchase authorization requests, wherein the unrecognized merchant identifier corresponds to an unrecognized merchant;

generating a plurality of unique signatures for the unrecognized merchant based on a combination of values of merchant attributes in the purchase authorization request having the unrecognized merchant identifier, wherein the plurality of unique signatures for the unrecognized merchant are based on the same combination of merchant attributes as the plurality of unique signatures for the plurality of registered merchants;

determining that one or more of the generated plurality of unique signatures for the unrecognized merchant match one or more of the plurality of unique signatures for the plurality of registered merchants; and in response to one or more of the generated plurality of unique signatures for the unrecognized merchant matching one or more of the plurality of unique signatures for the plurality of registered merchants, associating the purchase authorization request having the unrecognized merchant identifier with the select merchant identifier of a registered merchant for which the one or more unique signatures for the unrecognized merchant and for the registered merchant match, and processing the purchase authorization request as originating from the matched registered merchant.

17. The computer-readable medium of claim 16, wherein processing the purchase authorization request includes applying at least one rule and, if the rule is not satisfied, the purchase authorization request is rejected.

18. The computer-readable medium of claim 17, wherein the rule is that the plurality of unique signatures must have been previously confirmed for the matched registered merchant a threshold number of times.

19. The computer-readable medium of claim 18, wherein the rule is that a minimum number of unique signatures for the unrecognized merchant must match one or more of the plurality of unique signatures for the plurality of registered merchants.

20. The computer-readable medium of claim 18, wherein the rule is that an account holder associated with the payment card must satisfy a threshold spending amount.

21. The computer-readable medium of claim 17, wherein the payment card is for an account with one or more merchant purses, wherein processing the purchase authorization request comprises:
- determining that an account holder associated with the purchase authorization request has sufficient funds for the purchase in a merchant purse associated with the matched registered merchant; and
- approving the purchase authorization request in response to the account holder having sufficient funds in the merchant purse.

* * * * *